July 7, 1925.
J. GUTH
ROCKING TRACTION DEVICE FOR FARM TRACTORS
Filed Oct. 12, 1923
1,544,743
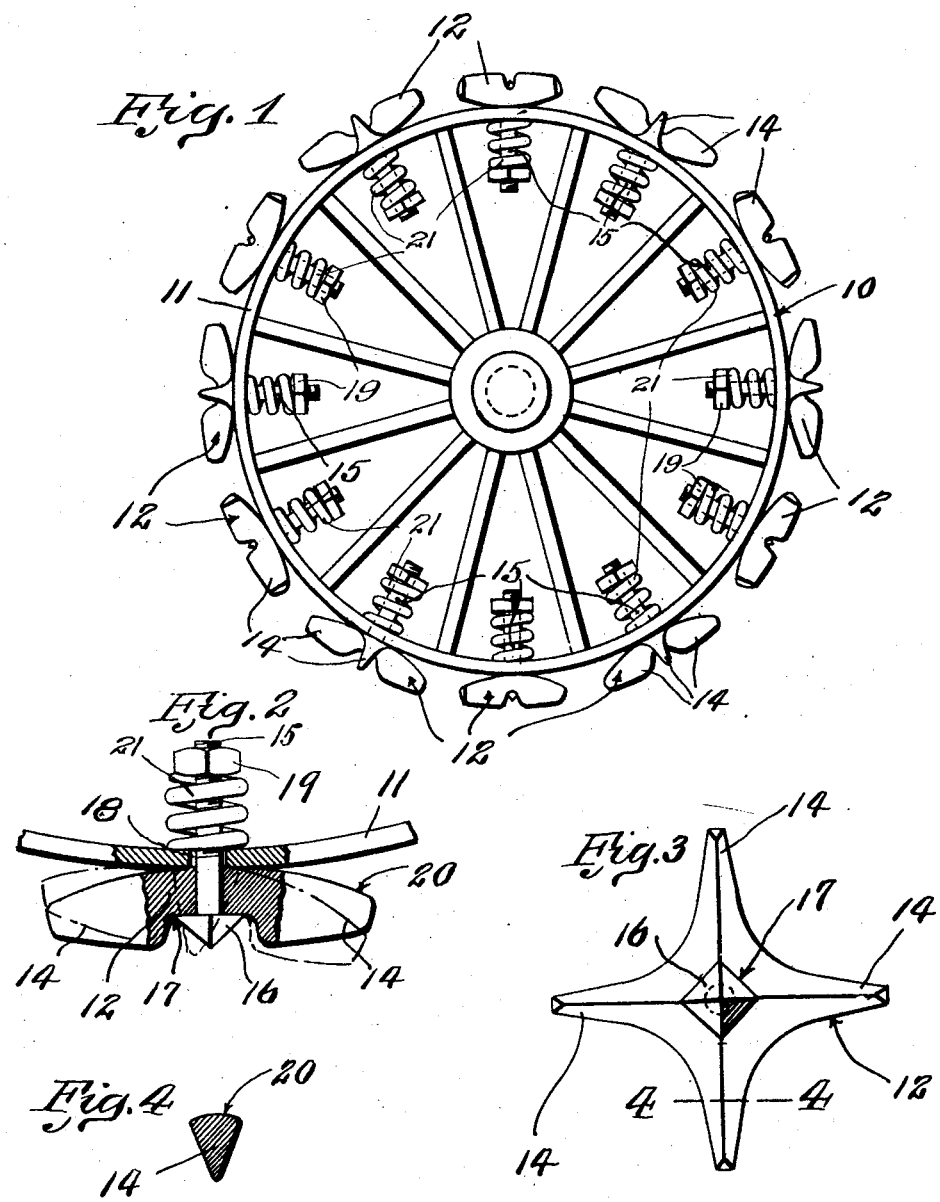
Inventor
Jacob Guth
By Cornwall, Bodely Janner
Attys.

Patented July 7, 1925.

1,544,743

UNITED STATES PATENT OFFICE.

JACOB GUTH, OF ST. LOUIS, MISSOURI.

ROCKING TRACTION DEVICE FOR FARM TRACTORS.

Application filed October 12, 1923. Serial No. 668,127.

*To all whom it may concern:*

Be it known that I, JACOB GUTH, a citizen of the United States, residing at 1109 High Street, in the city of St. Louis, State of Missouri (whose P. O. address is 1109 High Street, St. Louis, Mo.), have invented a certain new and useful Improvement in a Rocking Traction Device for Farm Tractors, of which the following is a full, clear, and exact description, such as will enable others skilled in the art to which it appertains to make and use the same.

This invention relates to new and useful improvements in tractor wheels and traction attachments therefor, and the objects of the invention are to provide a wheel for tractors, which wheel is provided on its periphery with a plurality of circumferentially disposed pivotally mounted lugs or traction devices designed to increase the tractive action of such wheels and at the same time facilitate the steering thereof.

Further objects of the invention are to provide traction devices for tractor wheels which devices are adapted to be rockingly mounted on the rim of the wheel whereby said devices can accommodate themselves to the contour of the road over which said wheel is traveling, thereby eliminating jolting and skidding of the wheel, increasing the traction thereof, and permitting easy steering operation.

With these and other objects in view, my invention consists in certain novel features of construction and arrangement of parts, hereinafter more fully described and claimed, and illustrated in the accompanying drawings, in which—

Figure 1 is an elevational view of a wheel equipped with my traction devices.

Figure 2 is an enlarged detail view, partly in cross section, of a portion of the rim and of the device attached thereto.

Figure 3 is a plan view of the traction device.

Figure 4 is a transverse cross section taken on lines 4—4 of Figure 3.

The present invention is particularly designed for use in connection with tractors of the type wherein the front wheels are driven. In this type of tractor, it is desirable that the wheels not only possess traction power, but also that they possess ease of operation in steering. To this purpose I provide traction devices arranged circumferentially on the wheels which increase the traction of the wheels and at the same time permit easy steering operations.

Referring by numerals to the accompanying drawings, 10 indicates a wheel to the rim 11 of which are pivotally secured lugs or devices 12 which are spaced equidistant from each other. These devices or lugs are preferably cruciform in shape, having cross arms 14 which are preferably V-shape in cross section. Each of these members is secured in position on the rim by a bolt 15, the head 16 of which is countersunk in a seat 17 formed in the center of each device. The shank of the bolt passes through an aperture 18 formed in the rim of the wheel and the threaded end of said bolt extends radially through said rim and receives a nut 19 which secures the bolt in position. The bolt 15 is loosely mounted in said aperture, the diameter of the latter being slightly greater than the diameter of the bolt in order to permit sufficient play and displacement of said bolt. A spring 21 is arranged on each bolt 15 inwardly of rim 11 and is held in position on the bolt by said nut 19, which bears against one end of said spring. This spring permits yielding movement of the lug 12 and parts associated therewith and is sufficiently strong to hold said lug in operative position at all times.

The inner face of each lug or device 12 which bears against the rim 11 is formed convex as indicated at 20 in order to permit rocking movement or angular displacement of said devices relative to the peripheral face of the rim.

The pivotal arrangement of the traction devices on the rim of the wheel provides for ease in operation in steering the wheel since the rim of the wheel is not in contact with the ground but rests on the convex face or faces of the traction devices which offer very little resistance to the turning movement of the wheel. The head 16 of bolt 15 is preferably of pyramid shape and the seat 17 in which head 16 is countersunk is non-circular and holds bolt 15 against accidental rotation.

A traction device of my improved construction is simple and durable and inexpensive to manufacture and a wheel equipped with my traction devices can be readily started and the traction qualities thereof is greatly increased by virtue of said traction devices.

While I have shown and described the preferred form of my invention, it is obvious that minor changes in the construction and form of my improved traction device can be made and substituted for those herein shown and described, without departing from the spirit of my invention.

I claim:

1. A tractor wheel comprising in combination with its rim, a plurality of traction devices disposed circumferentially on said rim and having convex rim engaging faces, and members carried by said devices and seated radially in said rim for pivotally mounting said devices thereon, each of said members having a loose bearing, said members having loose bearings in said rim for permitting movement of said devices in all directions.

2. A tractor wheel comprising in combination with its rim, a plurality of traction devices of cruciform shape, the arms of which are V-shaped in cross-section, and pins seated in said devices and extending radially through said rim for loosely mounting said devices in position, the rim engaging faces of said devices being convex.

3. A tractor wheel provided in its rim with spaced radially disposed apertures, a plurality of traction devices having cross arms V-shaped in cross section and provided with convex faces for engaging the peripheral face of the rim, and attaching means seated in said traction devices and passing inwardly through said apertures for securing said traction devices in position on said rim, said attaching means being loosely mounted in said apertures to permit universal movement of said traction devices.

4. In a tractor wheel provided in its rim with spaced radially disposed apertures, a plurality of traction devices having convex inner faces for engaging the peripheral face of said rim and outwardly presented tapered faces, a bolt seated in each traction device and extending inwardly through the aperture in said rim, the diameter of said bolt being less than the diameter of said aperture, thereby permitting angular displacement of said bolt and the respective traction device relative to the rim of said wheel, and means for engaging the inner end of said bolt and securing the traction device in position.

In testimony whereof I hereunto affix my signature this 9th day of October, 1923.

JACOB GUTH.